(12) United States Patent
Willett

(10) Patent No.: US 7,802,979 B2
(45) Date of Patent: Sep. 28, 2010

(54) DOUGH MOULDER

(75) Inventor: Paul Eaton Willett, Whiteside (AU)

(73) Assignee: Moffat PTY Limited, Mulgrave (AU)

( * ) Notice: Subject to any disclaimer, the term of this patent is extended or adjusted under 35 U.S.C. 154(b) by 302 days.

(21) Appl. No.: 12/061,414

(22) Filed: Apr. 2, 2008

(65) Prior Publication Data

US 2009/0252824 A1  Oct. 8, 2009

(51) Int. Cl.
*A21C 7/01* (2006.01)
*A21C 7/02* (2006.01)

(52) U.S. Cl. .......... 425/302.1; 425/320; 425/324.1; 425/332; 425/335; 425/364 R (58) Field of Classification Search .......... 425/302.1, 425/320, 324.1, 332, 335, 364 R
See application file for complete search history.

(56) References Cited

U.S. PATENT DOCUMENTS

| | | | | |
|---|---|---|---|---|
| 793,155 | A * | 6/1905 | Piper | 425/332 |
| 925,235 | A * | 6/1909 | Scott et al. | 425/332 |
| 1,366,266 | A * | 1/1921 | Lauterbur | 425/320 |
| 1,782,006 | A * | 11/1930 | Kremmling | 425/332 |
| 2,829,606 | A | 4/1958 | Dielentheis | 107/9 |
| 2,856,869 | A | 10/1958 | Fram et al. | 107/9 |
| 3,167,032 | A | 1/1965 | Rhodes | 107/4 |
| 3,521,578 | A * | 7/1970 | Fraioli, Sr. | 425/332 |
| 4,966,071 | A * | 10/1990 | Willett | 425/302.1 |
| 4,971,545 | A * | 11/1990 | Willett | 425/321 |
| 4,976,600 | A | 12/1990 | Willett | 425/151 |
| 6,361,307 | B1 | 3/2002 | Bernhard et al. | 425/193 |
| 7,128,555 | B2 | 10/2006 | Willett | 425/193 |

FOREIGN PATENT DOCUMENTS

JP  2004180646  7/2004

OTHER PUBLICATIONS

Australian Search Report from counterpart foreign Application No. AU2007/900715 filed on Feb. 14, 2007.

* cited by examiner

*Primary Examiner*—James Mackey
(74) *Attorney, Agent, or Firm*—David D. Brush; Westman, Champlin & Kelly, P.A.

(57) ABSTRACT

A dough moulder including a dough conveyor operable to receive a strip of dough, the conveyor having a first run operable to co-operate with a curling element to curl or roll the dough strip into a dough piece and a second run operable with a pressure rolling board to mould the dough piece, wherein the pressure rolling board has an upper section and a lower section, the lower section including a plurality of formed channels or troughs.

18 Claims, 8 Drawing Sheets

DOUGH MOULDER

FIELD OF THE INVENTION

This invention relates to a dough moulder, for example a dough moulder which is suitable for moulding dough of different volumes or weight to suit a range of bread and/or breadstick sizes.

BACKGROUND OF THE INVENTION

With the recent introduction of bakery set up in commercial shopping outlets or the bakery departments in supermarkets, a premium is placed on working space and flexibility of product production. As many of the products are produced in relatively small runs, the economics of a bakery of this type is generally improved if as many types of product can be produced from as few dough types as possible and the number of pieces of equipment used to produce the different products can be minimised.

Bread moulders are conventionally used to receive a piece of pre-weighted dough and mould to a desired shape for a specific bakery product before it is proved and baked.

In an effort to diversify product lines from single dough sources, it is often desirable to use the same dough for loaf production as roll production. For roll production this involves moulding the dough, dividing the dough into appropriately sized portions and then shaping the dough into final product form prior to baking. Round bread rolls are commonly produced by dividing off a portion of dough, rounding it into a rough ball and compressing the ball into a flattish circular shape. The flattened ball of dough is then compressed under a plate where the round disc is cut into similar sized portions. The disc then orbits for a predetermined period of time and each roll portion of dough is rounded up into a ball. The balls are then placed on baking trays where they are given a final proof and then baked. While there are several other methods of producing round rolls, all generally require the round roll to be made from a larger dough portion. This larger dough portion generally comes directly from the mixing machine.

It is well known that dough that is first sheeted out and flattened before further refining creates a better texture because the sheeting process aligns the cells in the dough. Such sheeting is difficult in round roll production as the sheeting process can overwork the dough making it difficult to hold its round shape during baking.

SUMMARY OF THE INVENTION

In one aspect, the invention provides a pressure rolling board for use in a bread moulder of the type including a dough conveyor operable to receive a strip of dough, the dough conveyor having a first run for cooperating with a curling element to curl or roll the dough strip into a dough piece and a second run operable with a pressure rolling board to mould the dough piece, the pressure board comprising an upper section and a lower section, the lower section including a plurality of formed troughs or channels.

The bread moulder is preferably of the type described in U.S. Pat. No. 7,128,555 in the name of Willett, the whole contents of which are incorporated herein by reference.

According to a second aspect of the invention there is provided a dough moulder including a dough conveyor operable to receive a strip of dough, the conveyor having a first run operable to co-operate with a curling element to curl or roll the dough strip into a dough piece and a second run operable with a pressure rolling board to mould the dough piece, wherein the pressure rolling board has an upper section and a lower section, the lower section including a plurality of formed channels or troughs.

The pressure board may be provided with a plurality of longitudinally extending grid slots adapted to receive grid plates. During its progress through the bread moulder, the dough which is rolled between the second run and the pressure board elongates and is contained within a confinement region defined by the grid slots and grid plates.

The lower section of the pressure board may further be provided with blade slots between each of the formed channels or troughs. The blade slots which are preferably along the upper edge of the wall of each channel or trough are adapted to receive blades which subdivide the containment region between the guide plates at the lower section of the pressure board. The blades perform the function of cutting and dividing the dough passing through the lower section of the containment regions. The dough divided by the blades passes along the individual channels.

As the dough is in compression under the action of the pressure board, the divided dough piece is able to expand to maintain contact with the second run of the conveyor.

The floor of each channel or trough progressively diverges from the plane of the pressure board and is provided with shaped edges or bevels to round the edges of the individual dough piece as it passes along the channel or trough.

It is preferable that these bevels and floor of the channel or trough are shaped so that the cross sectional area of the divided space between the pressure board and the second run of the conveyor remains substantially unchanged. Alternatively, the shaping provided by the bevels provides a substantially constant cross sectional area across the diameter of the dough piece as it progressed down the channel.

The upper edge of the wall of each channel or trough preferably is in the same plane as the upper section of the pressure board. Thus if the blade are not inserted into the slots the dough is able to roll past the lower section of the pressure board along the upper edges of the wall without being affected by the channels in the lower section of the pressure board.

In one preferred form of the invention, the lower section of the pressure board may be hinged to enable the channels to be raised when the blades are inserted in the blade slots. This enables pressure to be applied to the dough pieces when in the channels.

DETAILED DESCRIPTION OF THE EMBODIMENTS

Figure 1:
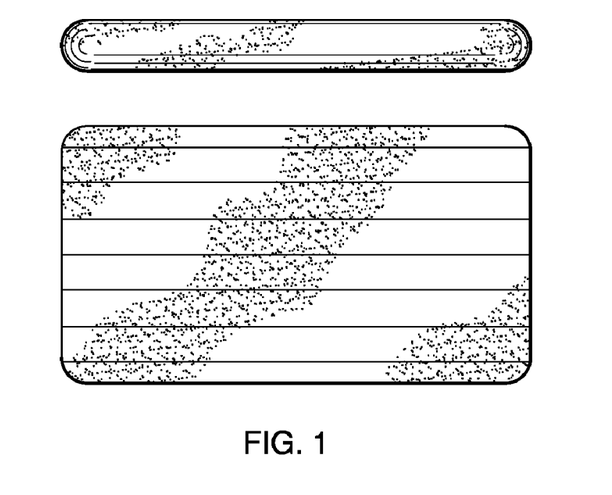
FIG. 1 is a side elevational and plan view of a flattened dough piece.

FIG. 1 illustrates a preformed dough piece that is about 200×110×22 mm. This is the ideal but not critical size and shape of a preformed dough piece and weighs about 400 to 500 grams. This dough piece may be fresh dough or thawed frozen dough. The direction lines [1], indicate the direction in which the dough piece texture has been formed during industrial production. The following method of producing rolls relies on the dough piece being presented to the machines rollers either forwards or crosswise, and although such lines are not visible in the dough piece, they indicate for clarity purposes whether the long or short side is being presented to the rollers.

Figure 2:
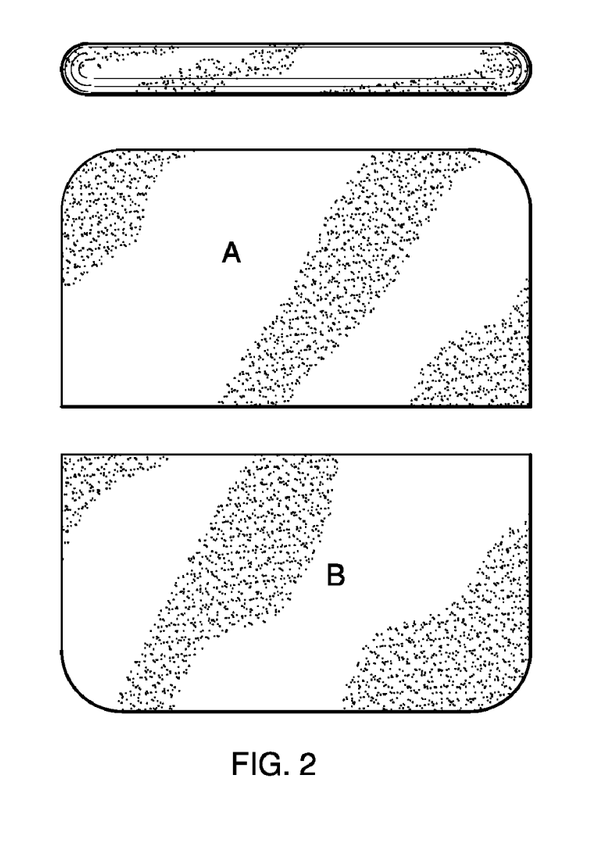
FIG. 2 is a side elevational and plan view of a dough piece of a double weighted portion of dough sheeted out and divided in two.

FIG. 2 illustrates one of the many options available for the industrial manufacture of a suitable shaped and sized piece. This option permits a double weight portion to be sheeted out into a flat oval shape, then it is cut in half, to obtain two perfectly acceptable shaped pieces of similar dimension to the dough piece of FIG. 1.

Figure 3:
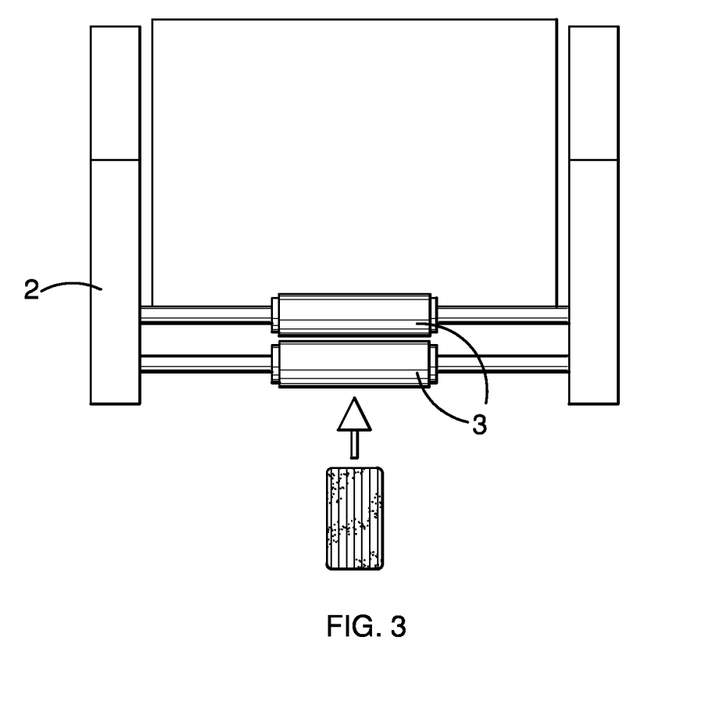
FIG. 3 is a schematic diagram of a typical long loaf or roll moulding machine showing the dough piece being fed lengthwise into the rollers.

FIG. 3 illustrates a typical long loaf or roll moulding machine [2] having one or more sets of sheeting rollers [3]. The illustrated dough piece is about 200×110 mm. Due to the alignment in the cells in the dough during sheeting, by feeding the dough piece into the rollers [3] lengthwise a different final shaped dough piece will emerge from the final shaping process. Feeding the dough piece this way permits more laminations in the final shape, and the dough is generally narrower, but larger in diameter when curled back up.

Figure 4:
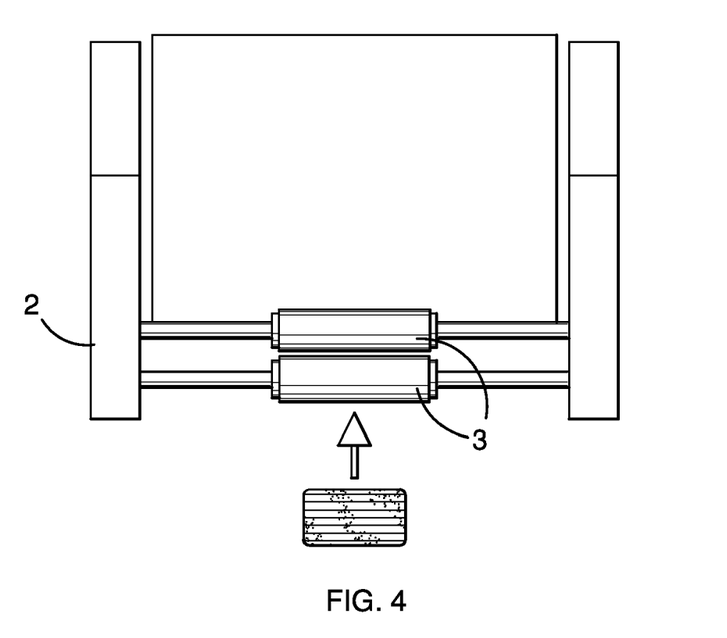
FIG. 4 is the long loaf or roll moulding machine of FIG. 3 showing the dough piece being fed sideways into the machine.

FIG. 4 illustrates a dough piece similar to the dough piece of FIG. 3 being fed in sideways, where the number of laminations are less, but the dough piece is longer when curled up. This also creates a less worked dough piece, particularly if the sheeting rollers [3] are set at a wider gap.

Figure 5:
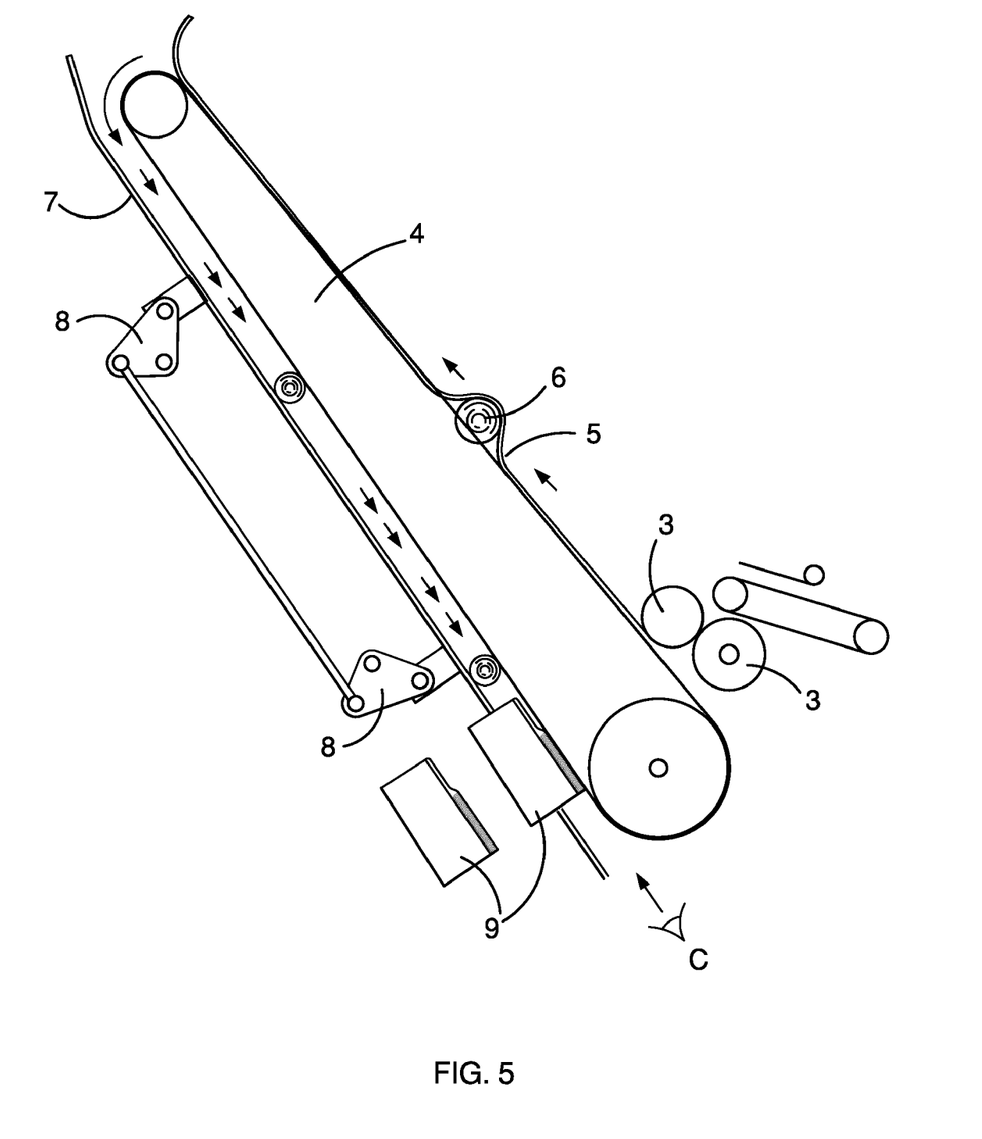
FIG. 5 is a side elevational view of a dough moulding machine having a pressure board in accordance with the present invention.

FIG. 5 illustrates a sectional side view of a long loaf or roll moulding machine with a pressure board according to the invention. The machine is similar to that shown in U.S. Pat. No. 7,128,555 with the inclusion of an improved pressure board. The moulding machine includes sheeting rollers [3], with a conveyor [4], beneath them. A curling chain [5] causes the flattened dough to curl up into a roughly coiled ball [6]. As the dough leaves the curling chain [5], it enters the underside of the conveyor [4], where it is rolled under pressure by a pressure board [7]. A curling mat is an alternative to the curling chain. Such a pressure board [7] may be raised or lowered from the underside of the conveyor [4] by means of bell crank linkages [8]. Blades [9] that can be raised through pressure board [7], are used to cut the dough into smaller portions as the dough piece [6] passes over them.

Figure 6:
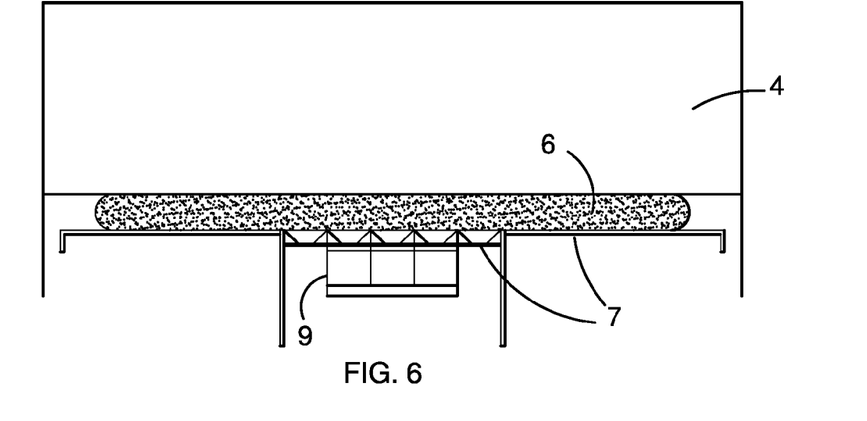
FIGS. 6-8 are an end view of the second run of the conveyor and pressure board taken from position C on FIG. 5 showing different arrangements of guides and blades.

FIG. 6 [VIEW C] illustrates the bottom of the conveyor [4] as viewed from the front of the machine. Pressure board [7] is shown set up with a dough piece [6] for product such as a French stick loaf. This is the typical use of such a bread moulder, and many brand machines of this type are used worldwide.

Figure 7:
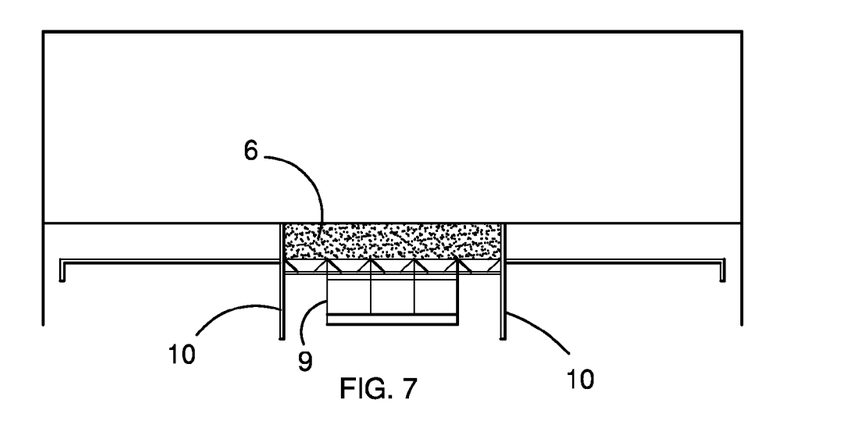

FIG. 7 [View C] illustrates a set of loaf length guides [10], that raise through the pressure board [7], and close to within approx 1 mm of the conveyor [4]. This permits the dough piece [6] to be contained within a confinement region of a set length, and the improves shape and tightness of the joint or seam in the dough piece. Where products such as Vienna or tinned loaves are produced, these guides [10] make final finishing easier as the dough piece is shaped uniformly.

Figure 8:
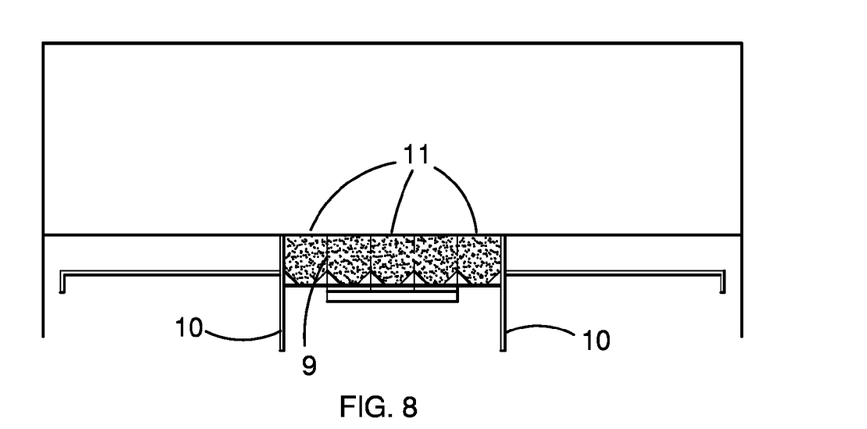

FIG. 8 [View C] illustrates the use of both the loaf guides [10] and the cutting blades [9], that cut the dough piece into 5 equal portions [11] for round bread rolls.

Figure 9:
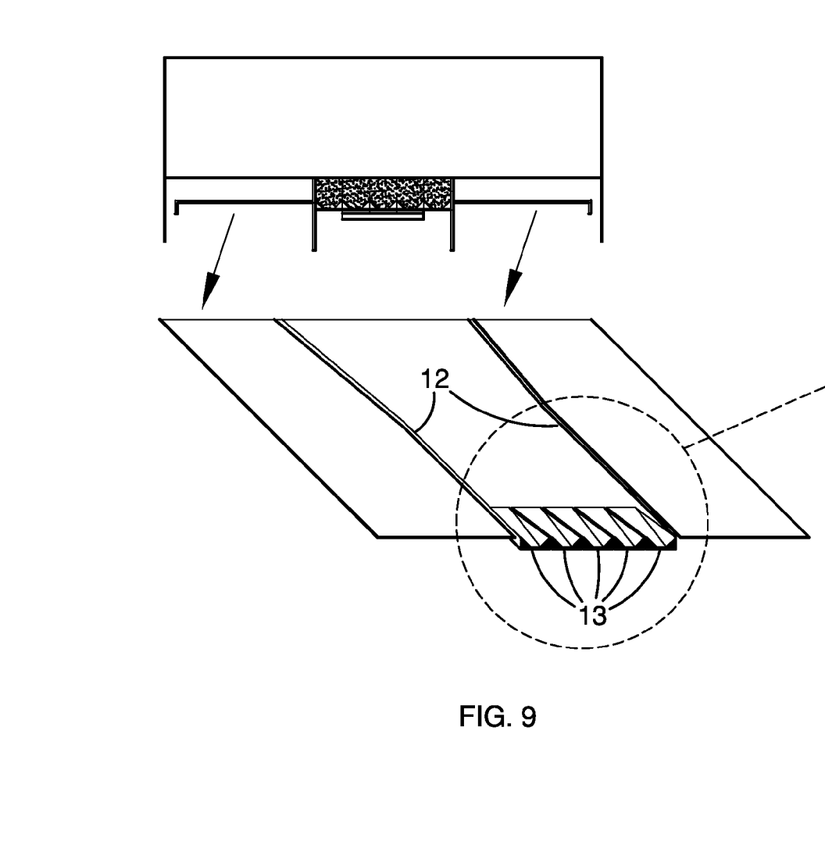
FIG. 9 is a schematic diagram of the pressure board in accordance with the invention.
Figure 9A:
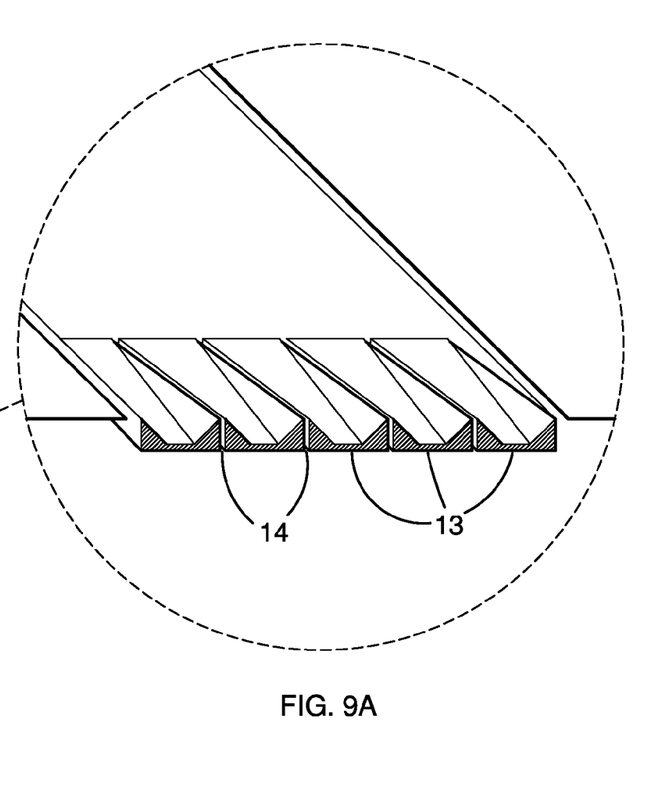
FIG. 9A is a view of a portion of the pressure board shown in FIG. 9.

FIG. 9 illustrates the pressure board [7], with slots [12] for loaf guides [10] running from front to rear. The lower section of the pressure board [7] is provided with formed channels or troughs [13] located at the end of the pressure board [7]. The lower section is also provided with slots [14] between the troughs or channels [13] along the wall between the troughs to permit blades [9] to pass through. It can be seen that the troughs [13] are provided with bevels which taper towards the end of the trough as the floor of the trough diverges from the plane of the pressure board.

Figure 10:
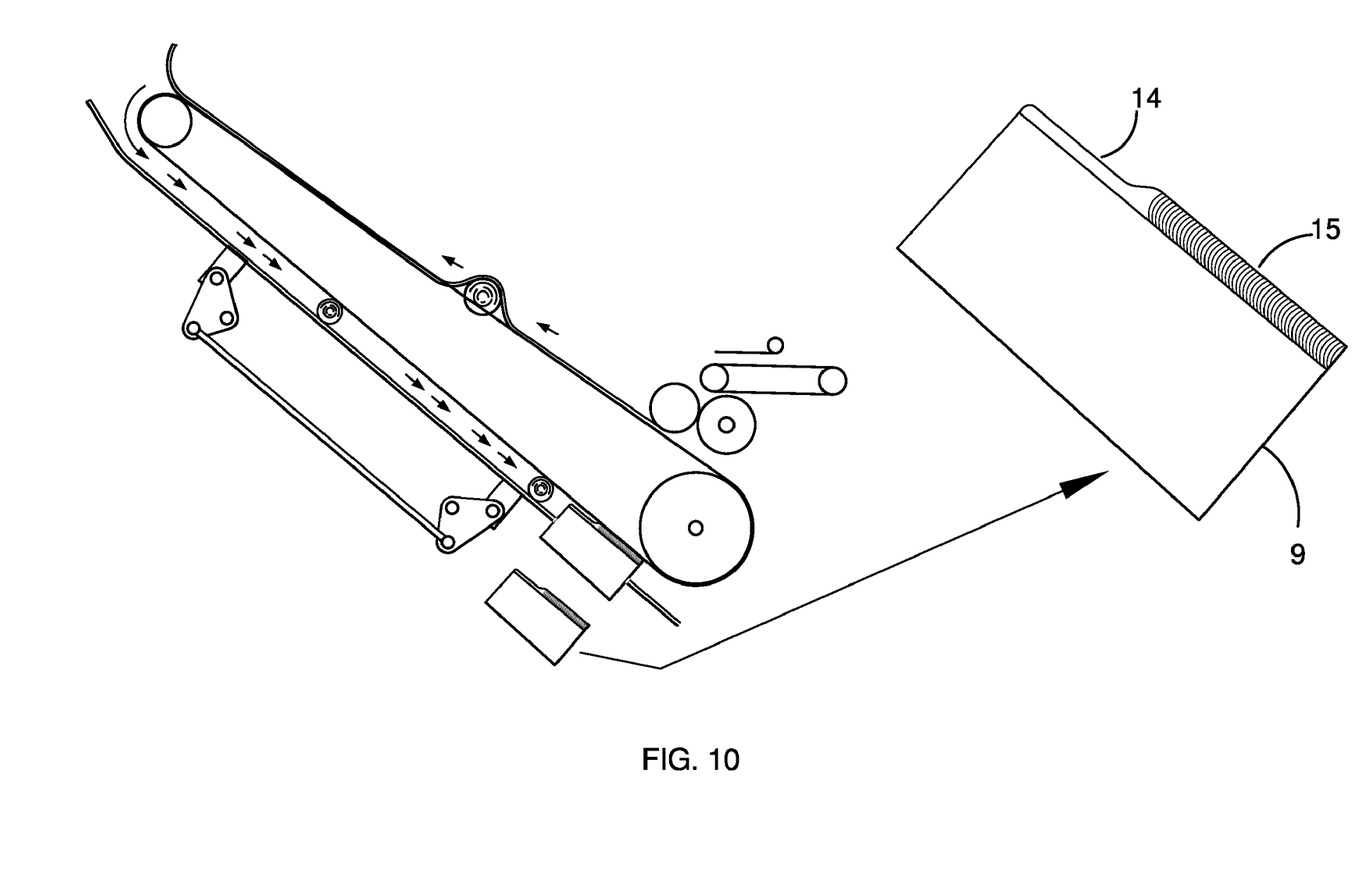
FIG. 10 is an illustration of a blade used in the lower section of the pressure board in accordance with the invention.

FIG. 10 illustrates a blade [9] used in the invention, although this shape can change without effecting the embodiment of the invention. Details of the blade design may be important, as the leading edge [14] begins the process of forming the dough ends prior to cutting through cleanly using sharpened edge [15]. Leading edge [14] has a 1.5 mm radius curve finish, rather than a cutting edge for this purpose. The purpose of these surfaces is to work in relationship with the formed sections [13] to both cut and roll the ends of the dough piece around as it passes through the trough, leaving only a small cut surface unsealed.

Figure 11:
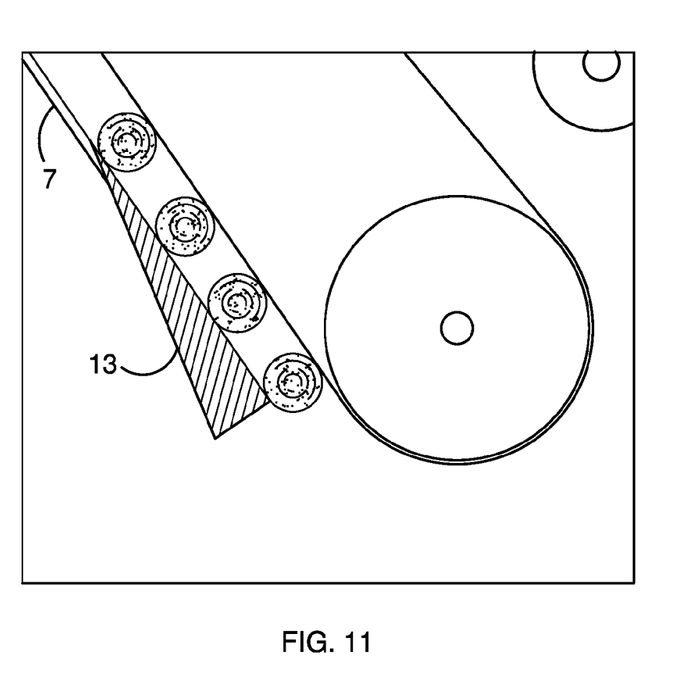
FIG. 11 is an illustration of the dough pieces contained by guide 10 when the blades are not engaged, passing over the top of the channels.

FIG. 11 illustrates in side view, how the formed channels or troughs [13], do not interfere with the dough pieces unless the blades [9] are in position in slots [14] because the troughs [13] are set below the level on plane of pressure board [7]. The sharp upper edges of the formed sections [13] permit the other dough pieces to pass over undamaged.

Figure 12:
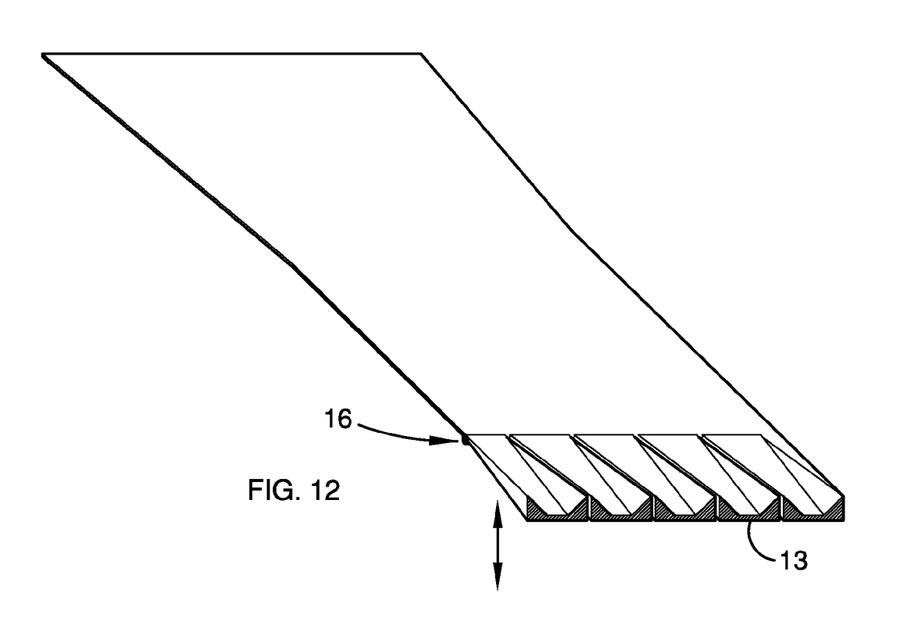
FIG. 12 is a second embodiment of the pressure board according to the invention showing a hinge for the lower region of the pressure board to enable the lower region to be raised and lowered.

FIG. 12 illustrates an option to automatically raise and lower the formed sections [13], by hinging the sections at point [16] so that formed sections [13] lower by mechanical linkage, as blades [9] are lowered.

Figure 13:
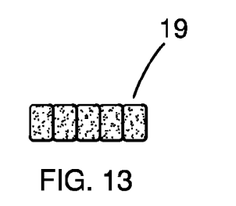
FIG. 13 is an illustration of a roll portion which results from dough being fed into a roll divider in accordance with an embodiment of the invention sideways.
Figure 14:
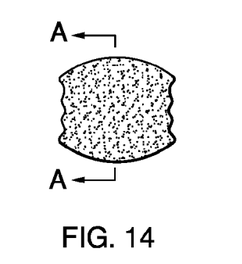
FIG. 14 is an enlarged view of a dough portion.

FIG. 13 illustrates the round roll portions 19 resulting from the dough piece [6] being fed into the sheeting rollers [3] sideways as illustrated in FIG. 4. This permits the dough piece to be less 'worked'. When the round roll portions [19] exit, they are rounded sufficiently to be batch packed [17] onto baking trays [18] as illustrated in FIG. 16, where the final proving and baking allow the rolls to join at the cut sections, leaving no visual signs on the baked product. A cross section of a dough piece A-A shown in FIG. 15, indicates a curled texture, that causes the roll portions to have thinner crust, better quality, and generally better fresh keeping qualities.

Figure 15:
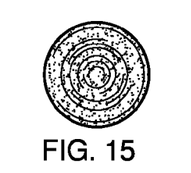
FIG. 15 is a cross section view of a dough portion taken along the line A-A illustrated in FIG. 14.
Figure 16:
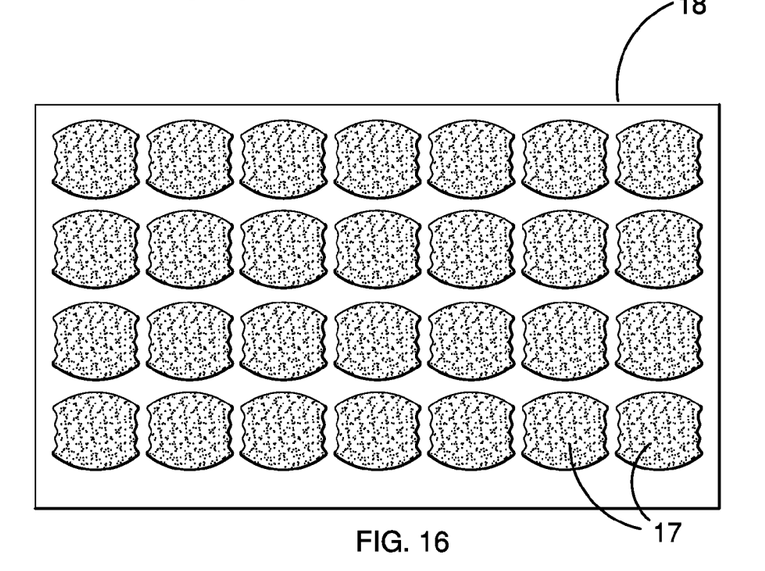
FIG. 16 illustrates round roll portions batch packs on a baking tray.
Figure 17:
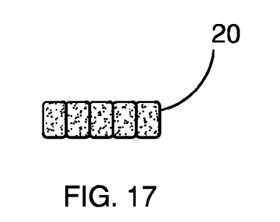
FIG. 17 is an illustration of the roll shaped portions reduced by dough being fed lengthwise into the dough moulder in accordance with an embodiment of the invention.
Figure 18:
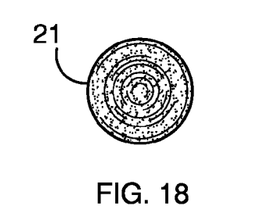
FIG. 18 is a cross section view of the roll shaped portion of FIG. 17.

FIG. 15 illustrates the roll shaped portions 20 resulting from the dough piece [6] being fed into the sheeting rollers [3] lengthways as illustrated in FIG. 3. This creates many laminations in the dough piece, as the sheeting rollers [3] are generally set closer together for this process. The dough pieces are more 'worked' when divided and shaped, so the roll shaped portions [20] illustrated in FIG. 17 are less rounded, and are generally larger in diameter and thinner. These portions [20] are laid flat on a cut side, with the other cut side facing upwards. The dough is more worked and as a consequence has a resilient texture as illustrated on FIG. 18 and is more able to hold toppings. These are then the ideal shape for rolls that are topped with seeds, cheese, etc, as the flat cut top holds the ingredients, while the texture inside the piece [21] creates a better product being 'cross grained', a process common when manufacturing breads expected to be long lasting, and of excellent fine texture.

The advantages of this process and invention, are many but includes reduced capital costs for machinery, as the bread moulder also produces round rolls. The expertise required to produce the products is reduced, as the process is very simple, and can work on a huge range of dough types and dough formulations. The space and cleaning issues are reduced as the machine has few parts that need cleaning. The maintenance and cost of repairs are low, as the components used are simple in their operation. The ability of the process to produce two types of rolls, each with outstanding advantages in texture, without the complication of changing of machine components or settings makes production ideal for a variety of roll types and products.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A dough moulder including a dough conveyor operable to receive a strip of dough, the conveyor having a first run operable to co-operate with a curling element to curl or roll the dough strip into a dough piece and a second run operable with a pressure rolling board to mould the dough piece, wherein the pressure rolling board has an upper section and a lower section, the lower section including a plurality of formed channels or troughs.

2. The dough moulder of claim 1 wherein the pressure board is provided with a plurality of longitudinally extending grid guide slots adapted to receive grid guide plates to define a confinement region for containing the dough piece.

3. The dough moulder of claim 1 wherein the lower section of the pressure board is further provided with blade slots, for receiving blades, between each of the formed channels or troughs.

4. The dough moulder of claim 3 wherein the pressure board is provided with a plurality of longitudinally extending guide slots adapted to receive guide plates to define a confinement region for containing the dough piece, and the blade slots are positioned along an upper edge of a wall of each channel or trough and are adapted to receive blades which subdivide the confinement region between the guide plates to cut and divide the dough passing through the confinement region.

5. The dough moulder of claim 1 wherein a floor of each channel or trough progressively diverges from the plane of the pressure board and is provided with shaped edges or bevels to round the edges of the individual dough piece as it passes along the channel or trough.

6. The dough moulder of claim 5 wherein the edges or bevels and floor of each channel or trough are shaped so that the cross sectional area for rolled dough between the pressure board and the second run of the conveyor is substantially constant as the rolled dough progresses down the channel or trough.

7. The dough moulder of claim 5 wherein the shaping of the edges or bevels provides a substantially constant cross sectional area across the diameter of the dough piece as it progressed down the channel or trough.

8. The dough moulder of claim 3 wherein an upper edge of the wall of each channel or trough is in the same plane as the upper section of the pressure board, so that if the blades are not inserted into the slots the dough is able to roll past the lower section of the pressure board along the upper edges of the wall without being affected by the channels in the lower section of the pressure board.

9. The dough moulder of claim 3 wherein the lower section of the pressure board is hinged to enable the channels or troughs to be raised when the blades are inserted in the blade slots such that pressure can be applied to the dough pieces when in the channels or troughs.

10. A pressure rolling board for use in a bread moulder of the type including a dough conveyor operable to receive a strip of dough, the dough conveyor having a first run for cooperating with a curling element to curl or roll the dough strip into a dough piece and a second run operable with the pressure rolling board along which the dough travels to mould the dough piece, a dough side of the pressure rolling board comprising an upper section and a lower section of which only the lower section includes a plurality of formed troughs or channels.

11. The pressure rolling board of claim 10 including a plurality of longitudinally extending grid guide slots adapted to receive guide plates to define a confinement region for containing the dough piece.

12. The pressure rolling board of claim 10 further including blade slots, for receiving blades, between each of the formed channels or troughs.

13. The pressure rolling board of claim 12 including a plurality of longitudinally extending guide slots adapted to receive guide plates to define a confinement region for containing the dough piece wherein the blade slots are positioned along an upper edge of a wall of each channel or trough and are adapted to receive blades which subdivide the confinement region between the guide plates to cut and divide the dough passing through the confinement region.

14. The pressure rolling board of claim 10 wherein a floor of each channel or trough progressively diverges from the plane of the pressure board and is provided with shaped edges or bevels to round the edges of the individual dough piece as it passes along the channel or trough.

15. The pressure rolling board of claim 14 wherein the shaped edges or bevels and floor of the channel or trough are shaped so that the cross sectional area for rolled dough between the pressure board and the second run of the conveyor remains is substantially constant as the rolled dough progresses down the channel or trough.

16. The pressure rolling board of claim 14 wherein the shaping of the edges or bevels provides a substantially constant cross sectional area across the diameter of the dough piece as it progressed down the channel or trough.

17. The pressure rolling board of claim 12 wherein an upper edge of the wall of each channel or trough is in the same plane as the upper section of the pressure board, so that if the blades are not inserted into the blade slots the dough is able to roll past the lower section of the pressure board along the upper edges of the wall without being affected by the channels in the lower section of the pressure board.

18. The pressure rolling board of claim 12 wherein the lower section of the pressure board is hinged to enable the channels or troughs to be raised when the blades are inserted in the blade slots such that pressure can be applied to the dough pieces when in the channels or troughs.

* * * * *